United States Patent
Bhargava et al.

(10) Patent No.: US 8,843,496 B2
(45) Date of Patent: Sep. 23, 2014

(54) SYSTEM AND METHOD FOR CLUSTERING HOST INVENTORIES

(71) Applicant: McAfee, Inc., Santa Clara, CA (US)

(72) Inventors: Rishi Bhargava, Cupertino, CA (US); David P. Reese, Jr., Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/016,497

(22) Filed: Sep. 3, 2013

(65) Prior Publication Data
US 2014/0006405 A1    Jan. 2, 2014

Related U.S. Application Data

(63) Continuation of application No. 12/880,125, filed on Sep. 12, 2010, now Pat. No. 8,549,003.

(51) Int. Cl.
*G06F 17/30* (2006.01)
*H04L 12/24* (2006.01)

(52) U.S. Cl.
CPC ...... *G06F 17/30705* (2013.01); *H04L 41/0893* (2013.01); *G06F 17/30017* (2013.01)
USPC .......................................................... 707/737

(58) Field of Classification Search
CPC .................... G06F 17/30705; G06F 17/30017; H04L 41/0893
USPC .......................... 707/737, 738, 748, 776, 791
See application file for complete search history.

(56) References Cited

U.S. PATENT DOCUMENTS

| | | | |
|---|---|---|---|
| 4,688,169 | A | 8/1987 | Joshi |
| 4,982,430 | A | 1/1991 | Frezza et al. |
| 5,155,847 | A | 10/1992 | Kirouac et al. |
| 5,222,134 | A | 6/1993 | Waite et al. |

(Continued)

FOREIGN PATENT DOCUMENTS

| | | | |
|---|---|---|---|
| EP | 1 482 394 A2 | 12/2004 | |
| EP | 2 037 657 A1 | 3/2009 | |

(Continued)

OTHER PUBLICATIONS

Bjornar Larsen et al., Fast and effective text mining using linear-time document clustering, 1999, ACM, 16-22.*

(Continued)

*Primary Examiner* — Jean B Fleurantin
(74) *Attorney, Agent, or Firm* — Patent Capital Group

(57) ABSTRACT

A method in one example implementation includes obtaining a plurality of host file inventories corresponding respectively to a plurality of hosts, calculating input data using the plurality of host file inventories, and then providing the input data to a clustering procedure to group the plurality of hosts into one or more clusters of hosts. The method further includes each cluster of hosts being grouped using predetermined similarity criteria. In more specific embodiments, each of the host file inventories includes a set of one or more file identifiers with each file identifier representing a different executable software file on a corresponding one of the plurality of hosts. In other more specific embodiments, calculating the input data includes transforming the host file inventories into a matrix of keyword vectors in Euclidean space. In further embodiments, calculating the input data includes transforming the host file inventories into a similarity matrix.

24 Claims, 9 Drawing Sheets

(56) References Cited

U.S. PATENT DOCUMENTS

| | | |
|---|---|---|
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,907,709 A | 5/1999 | Cantey et al. |
| 5,907,860 A | 5/1999 | Garibay et al. |
| 5,926,832 A | 7/1999 | Wing et al. |
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,587,877 B1 | 7/2003 | Douglis et al. |
| 6,611,925 B1 | 8/2003 | Spear |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,346,781 B2 | 3/2008 | Cowie et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,937,334 B2 * | 5/2011 | Bonissone et al. ............... 706/11 |
| 7,937,455 B2 | 5/2011 | Saha et al. |
| 7,966,659 B1 | 6/2011 | Wilkinson et al. |
| 7,987,230 B2 | 7/2011 | Sebes et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,195,931 B1 | 6/2012 | Sharma et al. |
| 8,234,713 B2 | 7/2012 | Roy-Chowdhury et al. |
| 8,291,497 B1 | 10/2012 | Griffin et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,341,627 B2 | 12/2012 | Mohinder |
| 8,352,930 B1 | 1/2013 | Sebes et al. |
| 8,381,284 B2 | 2/2013 | Dang et al. |
| 8,495,060 B1 | 7/2013 | Chang |
| 8,515,075 B1 | 8/2013 | Saraf et al. |
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 8,615,502 B2 | 12/2013 | Saraf et al. |
| 8,701,182 B2 | 4/2014 | Bhargava et al. |
| 8,701,189 B2 | 4/2014 | Saraf et al. |
| 8,707,422 B2 | 4/2014 | Bhargava et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0073894 A1 | 4/2003 | Chiang et al. |
| 2003/0074552 A1 | 4/2003 | Olkin et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |

(56) References Cited

U.S. PATENT DOCUMENTS

| | | |
|---|---|---|
| 2004/0015554 A1 | 1/2004 | Wilson |
| 2004/0051736 A1 | 3/2004 | Daniell |
| 2004/0054928 A1 | 3/2004 | Hall |
| 2004/0143749 A1 | 7/2004 | Tajali et al. |
| 2004/0167906 A1 | 8/2004 | Smith et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2005/0018651 A1 | 1/2005 | Yan et al. |
| 2005/0086047 A1 | 4/2005 | Uchimoto et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2010/0071035 A1 | 3/2010 | Budko et al. |
| 2010/0077479 A1 | 3/2010 | Viljoen |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047543 A1 | 2/2011 | Mohinder |
| 2011/0078550 A1 | 3/2011 | Nabutovsky |
| 2011/0099634 A1 | 4/2011 | Conrad et al. |
| 2011/0113467 A1 | 5/2011 | Agarwal et al. |
| 2011/0138461 A1 | 6/2011 | Bhargava et al. |
| 2012/0030731 A1 | 2/2012 | Bhargava et al. |
| 2012/0030750 A1 | 2/2012 | Bhargava et al. |
| 2012/0278853 A1 | 11/2012 | Chowdhury et al. |
| 2012/0290828 A1 | 11/2012 | Bhargava et al. |
| 2013/0024934 A1 | 1/2013 | Sebes et al. |
| 2013/0031111 A1 | 1/2013 | Jyoti et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0117823 A1 | 5/2013 | Dang et al. |
| 2013/0246423 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247192 A1 | 9/2013 | Krasser |
| 2013/0326620 A1 | 12/2013 | Merza et al. |
| 2014/0006405 A1 | 1/2014 | Bhargava et al. |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

Notification of International Preliminary Report on Patentability and Written Opinion mailed May 24, 2012 for International Application No. PCT/US2010/055520, 5 pages.

Sailer et al., sHype: Secure Hypervisor Approach to Trusted Virtualized Systems, IBM research Report, Feb. 2, 2005, 13 pages.

Kurt Gutzmann, "Access Control and Session Management in the HTTP Environment," Jan./Feb. 2001, pp. 26-35, IEEE Internet Computing.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

Cilibrasi, Rudi Langston, "Statistical Inference Through Data Compression," Institute for Logic, Language and Computation, ISBN: 90-6196-540-3, Copyright 2007, retrieved Sep. 10, 2010 from http://www.illc.uva.nl/Publications/Dissertations/DS-2007-01.text.pdf, 225 pages.

Karypis, George, Contact/METIS/CLUTO/MONSTER/YASSPP/Forums, Internal Lab Website, copyright 2006-2010, retrieved Sep. 10, 2010 from http://glaros.dtc.umn.edu/gkhome, 1 page.

(56) References Cited

OTHER PUBLICATIONS

Tagarelli, et al., "A Segment-based Approach to Clustering Multi-Topic Documents," copyright 2005-2010, George Karypis, Internal Lab Website, retrieved Sep. 10, 2010 from http://glaros.dtc.umn.edu/gkhome/cluto/cluto/publications, 1 page.

Ying Zhao and George Karypis, "Hierarchical Clustering Algorithms for Document Datasets," copyright 2005-2010, George Karypis, Internal Lab Website, retrieved Sep. 10, 2010 from http://glaros.dtc.umn.edu/gkhome/cluto/cluto/publications, 1 page.

Ying Zhao and George Karypis, "Topic-Driven Clustering for Document Datasets," copyright 2005-2010, George Karypis, Internal Lab Website, retrieved Sep. 10, 2010 from http://glaros.dtc.umn.edu/gkhome/cluto/cluto/publications, 1 page.

Ying Zhao and George Karypis, "Empirical and Theoretical Comparisons of Selected Criterion Functions for Document Clustering," copyright 2005-2010, George Karypis, Internal Lab Website, retrieved Sep. 10, 2010 from http://glaros.dtc.umn.edu/gkhome/cluto/cluto/publications, 1 page.

Ying Zhao and George Karypis, "Clustering in Life Sciences," copyright 2005-2010, George Karypis, Internal Lab Website, retrieved Sep. 10, 2010 from http://glaros.dtc.umn.edu/gkhome/cluto/cluto/publications, 1 page.

Ying Zhao and George Karypis, "Evaluation of Hierarchical Clustering Algorithms for Document Datasets," copyright 2005-2010, George Karypis, Internal Lab Website, retrieved Sep. 10, 2010 from http://glaros.dtc.umn.edu/gkhome/cluto/cluto/publications, 1 page.

Ying Zhao and George Karypis, "Criterion Fuctions for Document Clustering: Experiments and Analysis," copyright 2005-2010, George Karypis, Internal Lab Website, retrieved Sep. 10, 2010 from http://glaros.dtc.umn.edu/gkhome/cluto/cluto/publications, 1 page.

Steinbach, et al., "A Comparison of Document Clustering Techniques," copyright 2005-2010, George Karypis, Internal Lab Website, retrieved Sep. 10, 2010 from http://glaros.dtc.umn.edu/gkhome/cluto/cluto/publications, 1 page.

Karypis, et al., "CHAMELEON: A Hierarchical Clustering Algorithm Using Dynamic Modelings," copyright 2005-2010, George Karypis, Internal Lab Website, retrieved Sep. 10, 2010 from http://glaros.dtc.umn.edu/gkhome/cluto/cluto/publications, 1 page.

Matt Rasmussen and George Karypis, "gCLUTO: An Interactive Clustering, Visualitzation, and Analysis System," copyright 2005-2010, George Karypis, Internal Lab Website, retrieved Sep. 10, 2010 from http://glaros.dtc.umn.edu/gkhome/cluto/gcluto/publications, 1 page.

Matthew Rasmussen, et al., "wCLUTO: A Web-enabled Clustering Toolkit," copyright 2005-2010, George Karypis, Internal Lab Website, retrieved Sep. 10, 2010 from http://glaros.dtc.umn.edu/gkhome/cluto/wcluto/publications, 1 page.

Dommers, Calculating the normalized compression distance between two strings, Jan. 20, 2009, retrieved Sep. 10, 2010 from http://www.c-sharpcorner.com/UploadFile/acinonyx72/NCD01202009071004AM/NCD.aspx, 5 pages.

A Tutorial on Clustering Algorithms, retrieved Sep. 10, 2010 from http://home.dei.polimi.it/matteucc/lustering/tutorial.html, 6 pages.

Barrantes et al., "Randomized Instruction Set Emulation to Dispurt Binary Code Injection Attacks," Oct. 27-31, 2003, ACM, pp. 281-289.

Gaurav et al., "Countering Code-Injection Attacks with Instruction-Set Randomization," Oct. 27-31, 2003, ACM, pp. 272-280.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Ju. 14, 2011.

Tal Garfinkel, et al., "Terra: A Virtual Machine-Based Paltform for Trusted Computing," XP-002340992, SOSP'03, Oct. 19-22, 2003, 14 pages.

IA-32 Intel® Architecture Software Developer's Manual, vol. 3B; Jun. 2006; pp. 13, 15, 22 and 145-146.

Mung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.

G. Pruett et al., "BladeCenter systems management software", [Online], Nov. 2005, pp. 963-975, [Retrieved from Internet on Oct. 24, 2012], <http://citeseerx.ist.pus.edu/viewdoc/download?doi=10.1.1.91.5091&rep=rep1&type=pdf>.

Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.

Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.

Taskar et al., Probabilistic Classification and Clustering in Relational Data, 2001, Google, 7 pages.

USPTO May 24, 2013 Notice of Allowance from U.S. Appl. No. 12/880,125.

International Preliminary Report on Patentability received from the PCT Application No. PCT/US2011/020677, mailed on Feb. 7, 2013, 9 pages.

International Preliminary Report on Patentability received for the PCT Application No. PCT/US2011/024869, mailed on Feb. 7, 2013, 6 pages.

Office Action received for the U.S. Appl. No. 12/880,125, mailed on Jul. 5, 2012, 12 pages.

*Ex Parte Quayle* Action received for the U.S. Appl. No. 12/880,125, mailed on Dec. 21, 2012, 4 pages.

USPTO Mar. 28, 2014 Nonfinal Rejection in U.S. Appl. No. 13/012,138, 21 pages.

\* cited by examiner $$\begin{array}{c} 1000 \\ \downarrow \end{array}$$

$$\begin{array}{c} 1060 \\ \downarrow \end{array} \quad \begin{array}{cccc} H_1 & H_2 & \cdots & H_n \end{array} \leftarrow 1070$$

$$\begin{array}{c} H_1 \\ H_2 \\ \vdots \\ H_n \end{array} \begin{bmatrix} a_{1,1} & a_{1,2} & \cdots & a_{1,n} \\ a_{2,1} & a_{2,2} & \cdots & a_{2,n} \\ \vdots & \vdots & \vdots & \vdots \\ a_{n,1} & a_{n,2} & \cdots & a_{n,n} \end{bmatrix}$$

$$\begin{array}{c} 1200 \\ \downarrow \end{array}$$

1260 $\quad H_1 \quad H_2 \quad H_3 \quad H_4 \quad H_5 \leftarrow 1270$ $$\begin{array}{c} H_1 \\ H_2 \\ H_3 \\ H_4 \\ H_5 \end{array} \begin{bmatrix} 1 & 0.25 & 0.75 & 0.25 & 0.25 \\ 0.25 & 1 & 0.25 & 0.75 & 0.25 \\ 0.75 & 0.25 & 1 & 0.25 & 0.25 \\ 0.25 & 0.75 & 0.25 & 1 & 0 \\ 0.25 & 0.25 & 0.25 & 0 & 1 \end{bmatrix}$$

FIG. 12

1280 (referenced at multiple positions)

SYSTEM AND METHOD FOR CLUSTERING HOST INVENTORIES

RELATED APPLICATION

This application is a continuation (and claims the benefit of priority under 35 U.S.C. §120) of U.S. patent application Ser. No. 12/880,125, filed Sep. 12, 2010, entitled, "SYSTEM AND METHOD FOR CLUSTERING HOST INVENTORIES," by inventors Rishi Bhargava et al. The disclosure of the prior application is considered part of (and is incorporated by reference in) the disclosure of this application.

TECHNICAL FIELD

This disclosure relates in general to the field of computer network administration and support and, more particularly, to identifying similar software inventories on selected hosts.

BACKGROUND

The field of computer network administration and support has become increasingly important and complicated in today's society. Computer network environments are configured for virtually every organization and usually have multiple interconnected computers (e.g., end user computers, laptops, servers, printing devices, etc.). Typically, each computer has its own set of executable software, each of which can be represented by an executable software inventory. For Information Technology (IT) administrators, congruency among executable software inventories of similar computers (e.g., desktops and laptops) simplifies maintenance and control of the network environment. Differences between executable software inventories, however, can arise in even the most tightly controlled network environments. In addition, each organization may develop its own approach to computer network administration and, consequently, some organizations may have very little congruency and may experience undesirable diversity of executable software on their computers. Particularly in very large organizations, executable software inventories may vary greatly among computers across departmental groups. Varied executable software inventories on computers within organizations present numerous difficulties to IT administrators to maintain, to troubleshoot, to service, and to provide uninterrupted access for business or other necessary activities. Innovative tools are needed to assist IT administrators to successfully support computer network environments with computers having incongruities between executable software inventories.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 10 illustrates an n×n similarity matrix format used in accordance with one embodiment of the present disclosure;

FIG. 12 illustrates a similarity matrix created by application of the flow of FIG. 11 to the example selected group of hosts of FIG. 6.

DETAILED DESCRIPTION OF EXAMPLE EMBODIMENTS

Overview

A method in one example implementation includes obtaining a plurality of host file inventories corresponding respectively to a plurality of hosts, calculating input data using the plurality of host file inventories, and providing the input data to a clustering procedure to group the plurality of hosts into one or more clusters of hosts. The method further includes each cluster of hosts being grouped using a predetermined similarity criteria. More specific embodiments include each of the plurality of host file inventories including a set of one or more file identifiers with each file identifier representing a different executable software file on a corresponding one of the plurality of hosts. In another more specific embodiment, the method includes each of the one or more file identifiers including a token sequence of one or more tokens. In other more specific embodiments, the calculating the input data includes transforming the plurality of host file inventories into a similarity matrix. In another more specific embodiment, the calculating the input data includes transforming the plurality of host file inventories into a matrix of keyword vectors in Euclidean space, where each keyword vector corresponds to one of the plurality of hosts.

Example Embodiments

Figure 1:
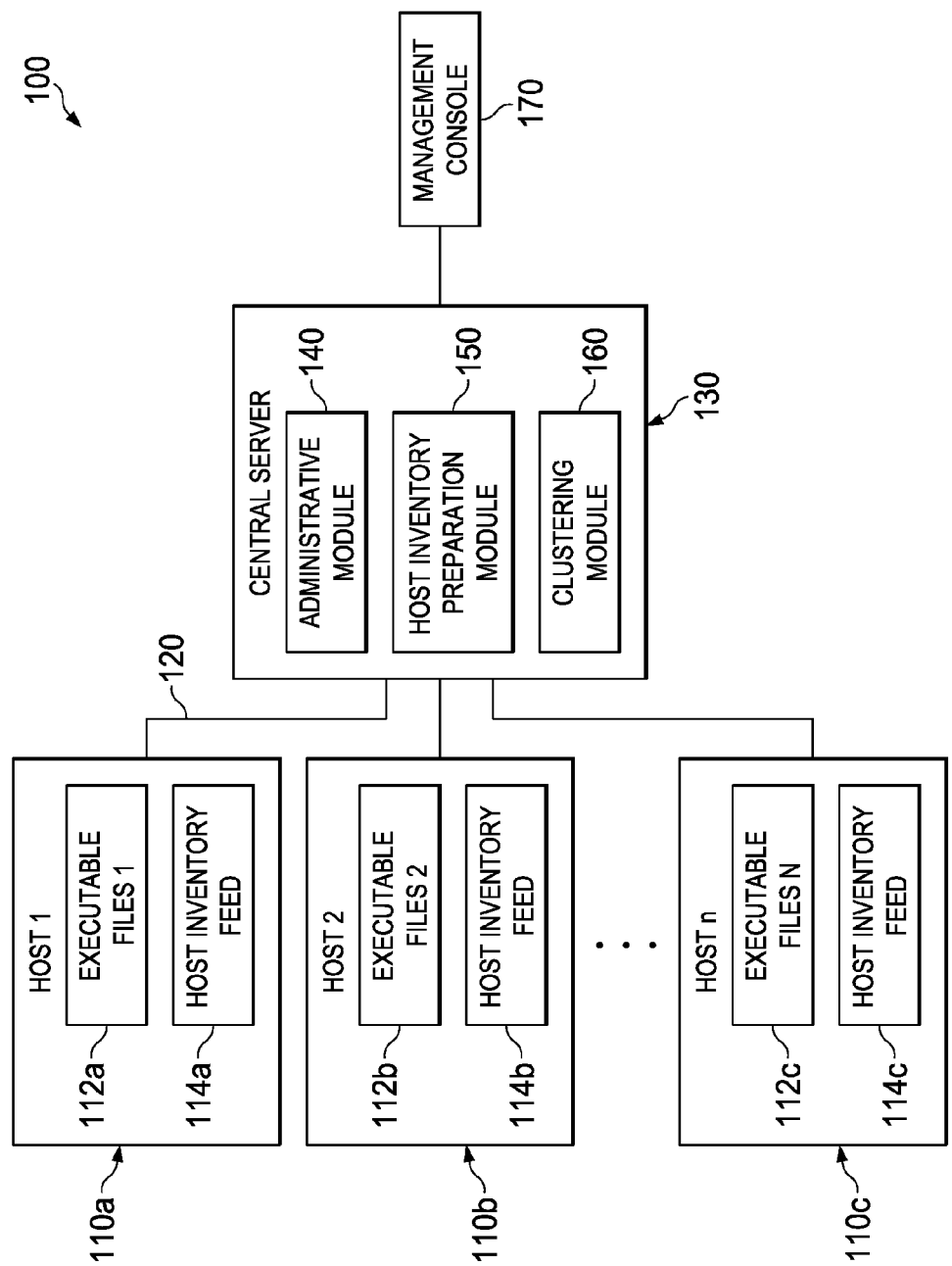
FIG. 1 is a pictorial representation of an exemplary network environment in which various embodiments of a system and method for clustering host inventories may be implemented in accordance with the present disclosure.

FIG. 1 is a pictorial representation of a computer network environment 100 in which embodiments of a system for clustering host inventories may be implemented in accordance with the present disclosure. Computer network environment 100 illustrates a network of computers including a plurality of hosts 110a, 110b, and 110c (referred to collectively herein as hosts 110), which may each have, respectively, a set of executable files 112a, 112b, and 112c (referred to collectively herein as sets of executable files 112) and a host inventory feed 114a, 114b, and 114c (referred to collectively herein as host inventory feeds 114). Hosts 110 may be operably connected to a central server 130 through communication link 120. Central server 130 may include an administrative module 140, a host inventory preparation module 150, and a clustering module 160. A management console 170 can also be suitably connected to central server 130 to provide an interface for users such as Information Technology (IT) administrators, network operators, and the like.

In example embodiments, the system for clustering host inventories may be utilized to provide valuable information to users (e.g., IT administrators, network operators, etc.) identifying computers having similar operating systems and installed executable software files. In one example, when the system for clustering host inventories is applied to a computer network environment such as network environment 100 of FIG. 1, software inventories from hosts 110 may be transformed by host inventory preparation module 150 into input data for a clustering algorithm or procedure. Clustering module 160 may apply the clustering algorithm to the prepared input data to create a clustering diagram or other information identifying logical groupings of hosts 110 having similar operating systems and installed sets of executable files 112. The clustering diagram may also identify any outlier hosts 110 having significant differences in operating systems and/or executable files relative to the other hosts 110 in network environment 100. Thus, the IT administrator or other user is provided with valuable information that enables the discovery of trends and exceptions of computers, such as hosts 110, in the particular network environment. As a result, common policies may be applied to computers within logical groupings and remedial action may be taken on any identified outlier computers.

For purposes of illustrating the techniques of the system for clustering host inventories, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals often include a plurality of computers such as end user desktops, laptops, servers, network appliances, and the like, and each may have an installed set of executable software. In large organizations, network environments may include hundreds or thousands of computers, which may span different buildings, cities, and/or geographical areas around the world. IT administrators may be tasked with the extraordinary responsibility of maintaining these computers in a way that minimizes or eliminates disruption to business activities.

One difficulty IT administrators face includes maintaining multiple computers in a chaotic or heterogeneous network environment. In such an environment, congruency between executable software of the computers may be minimal. For example, executable files may be stored in different memory locations on different computers, different versions of executable files may be installed in different computers, executable files may be stored on some computers but not on others, and the like. Such networks may require additional time and resources to be adequately supported as IT administrators may need to individualize policies, maintenance, upgrades, repairs, and/or any other type of support to suit particular computers having nonstandard executable software and/or operating systems.

Homogenous network environments, in which executable software of computers are congruent or at least similar, may also benefit from a system and method for clustering host inventories. In homogeneous environments or substantially homogeneous environments, particular computers may occasionally deviate from standard computers within the network environment. For example, malicious software may break through the various firewalls and other network barriers creating one or more deviant computers. In addition, end users of computers may install various executable software files from transportable disks or download such software creating deviant computers. In accordance with the present disclosure, a system for clustering host inventories could readily identify any outliers having nonstandard and possibly malicious executable software.

A system and method for clustering host inventories, as outlined in FIG. 1, could greatly enhance abilities of IT administrators or other users managing computer networks to effectively support both heterogeneous and homogeneous network environments. The system, which may be implemented in a computer such as server 130, enables identification of logical groupings of computers with similar executable file inventories and identification of outliers (e.g., computers with drastically different executable file inventories). In accordance with one example implementation, host file inventories of executable files from hosts 110 are provided for evaluation. The host file inventories are transformed into input data for a clustering algorithm. Once the input data is prepared, the clustering algorithm is applied and one or more diagrams or charts may be created to show logical clusters or groupings of hosts 110 having the same or similar software inventories. In addition, the diagrams or charts may also show any of the hosts 110 that drastically deviate from other hosts 110. Thus, the system provides network or IT administrators with valuable information that may be used to more effectively manage hosts 110 within network environment 100.

Note that in this Specification, references to various features (e.g., elements, structures, modules, components, steps, etc.) included in "one embodiment", "example embodiment", "an embodiment", "another embodiment", "some embodiments", "various embodiments", "one example", "other embodiments", and the like are intended to mean that any such features may be included in one or more embodiments of the present disclosure, but may or may not necessarily be included in the same embodiments.

Turning to the infrastructure of FIG. 1, the example network environment 100 may be configured as one or more networks and may be configured in any form including, but not limited to, local area networks (LANs), wide area networks (WANs) such as the Internet, or any combination thereof. In some embodiments, communication link 120 may represent any electronic link supporting a LAN environment such as, for example, cable, Ethernet, wireless (e.g., WiFi), ATM, fiber optics, etc. or any combination thereof. In other embodiments, communication link 120 may represent a remote connection to central server 130 through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area network (e.g., the Internet). In addition, gateways, routers and the like may be used to facilitate electronic communication between hosts 110 and central server 130.

In an example embodiment, hosts 110 may represent end user computers that could be operated by end users. The end user computers may include desktops, laptops, and mobile or handheld computers (e.g., personal digital assistants (PDAs) or mobile phones). Hosts 110 can also represent other computers (e.g., servers, appliances, etc.) having executable software, which could be similarly evaluated and clustered by the system, using executable file inventories derived from sets of executable files 112 on such hosts 110. It should be noted that the network configurations and interconnections shown and described herein are for illustrative purposes only. FIG. 1 is intended as an example and should not be construed to imply architectural limitations in the present disclosure.

Sets of executable files 112 on hosts 110 can include all executable files on respective hosts 110. In this Specification, references to "executable file", "program file", "executable software file", and "executable software" are meant to encompass any software file comprising instructions that can be understood and processed by a computer such as executable files, library modules, object files, other executable modules, script files, interpreter files, and the like. In one embodiment, the system could be configured to allow the IT administrator to select a particular type of executable file to be clustered. For example, an IT Administrator may choose only dynamic-link library (DLL) modules for clustering. Thus, sets of executable files 112 would include only DLL modules on the respective hosts 110. In addition, the IT administrator may also be permitted to select particular hosts to which clustering is applied. For example, all end user computers in a network or within a particular part of the network may be selected. In another example, all servers within a network or within a particular part of the network may be selected.

Central server 130 of network environment 100 represents an exemplary server or other computer linked to hosts 110, which may provide services to hosts 110. The system of clustering host inventories may be implemented in central server 130 using various embodiments of host inventory preparation module 150 and clustering module 160. For example, keyword techniques may be used with vector based clustering in one example embodiment. In this example embodiment, host inventory preparation module 150 creates an (n×m) vector matrix where columns of the matrix may correspond to a determined number (i.e., "m") of unique keywords, each of which is associated with one or more executable files in a selected number (i.e., "n") of hosts. The rows of the vector matrix may correspond to the n selected hosts. Clustering module 160 can then apply a clustering algorithm to the vector matrix to create logical groupings of the n selected hosts. In another example embodiment, compression techniques may be used with similarity based clustering. In this example embodiment, host inventory preparation module 150 may create an (n×n) similarity matrix using compression techniques for a selected number (i.e., "n") of hosts. Clustering module 160 may then apply a clustering algorithm to the similarity matrix to create logical groupings of the n selected hosts. In one embodiment, selected hosts may include all of the hosts 110 in a particular network environment such as network environment 100. In other embodiments, selected hosts may include particular hosts selected by a user or predefined by policy, with such hosts existing in one or more network environments.

Management console 170 linked to central server 130 may provide viewable cluster data for the IT administrators or other authorized users. Administrative module 140 may also be incorporated to allow IT administrators or other authorized users to add the logical groupings from a cluster analysis to an enterprise management system and to apply common policies to selected groupings. In addition, deviant or exceptional groupings or outliers can trigger various remedial actions (e.g., emails, vulnerability scans, etc.). In addition, management console 170 may also provide a user interface for the IT Administrator to select particular hosts and/or particular types of executable files to be included in the clustering procedure, in addition to other user provided configuration data for the system. One exemplary enterprise management system that could be used includes McAfee® electronic Policy Orchestrator (ePO) software manufactured by McAfee, Inc. of Santa Clara, Calif.

Figure 2:
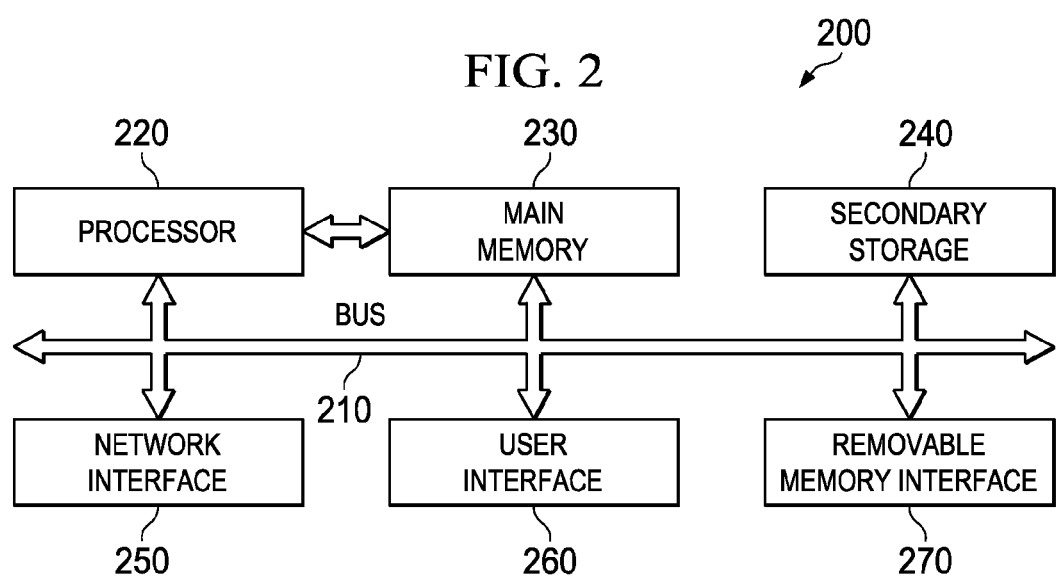
FIG. 2 is a simplified block diagram of a computer, which may be utilized in embodiments in accordance with the present disclosure.

Turning to FIG. 2, FIG. 2 is a simplified block diagram of a general or special purpose computer 200, such as hosts 110, central server 130, or other computing devices connected to network environment 100. Computer 200 may include various components such as a processor 220, a main memory 230, a secondary storage 240, a network interface 250, a user interface 260, and a removable memory interface 270. A bus 210, such as a system bus, may provide electronic communication between processor 210 and the other components, memory, and interfaces of computer 200.

Processor 220, which may also be referred to as a central processing unit (CPU), can include any general or special-purpose processor capable of executing machine readable instructions and performing operations on data as instructed by the machine readable instructions. Main memory 230 may be directly accessible to processor 220 for accessing machine instructions and can be in the form of random access memory (RAM) or any type of dynamic storage (e.g., dynamic random access memory (DRAM)). Secondary storage 240 can be any non-volatile memory such as a hard disk, which is capable of storing electronic data including executable software files. Externally stored electronic data may be provided to computer 200 through removable memory interface 270. Removable memory interface 270 may provide connection to any type of external memory such as compact discs (CDs), digital video discs (DVDs), flash drives, external hard drives, or any other external media.

Network interface 250 can be any network interface controller (NIC) that provides a suitable network connection between computer 200 and any networks to which computer 200 connects for sending and receiving electronic data. For example, network interface 250 could be an Ethernet adapter, a token ring adapter, or a wireless adapter. A user interface 260 may be provided to allow a user to interact with the computer 200 via any suitable means, including a graphical user interface display. In addition, any appropriate input mechanism may also be included such as a keyboard, mouse, voice recognition, touch pad, input screen, etc.

Not shown in FIG. 2 is additional hardware that may be suitably coupled to processor 220 and bus 210 in the form of memory management units (MMU), additional symmetric multiprocessing (SMP) elements, read only memory (ROM), peripheral component interconnect (PCI) bus and corresponding bridges, small computer system interface (SCSI)/integrated drive electronics (IDE) elements, etc. Any suitable operating systems will also be configured in computer 200 to appropriately manage the operation of hardware components therein. These elements, shown and/or described with reference to computer 200, are intended for illustrative purposes and are not meant to imply architectural limitations of computers such as hosts 110 and central server 130, utilized in accordance with the present disclosure. As used herein in this Specification, the term 'computer' is meant to encompass any personal computers, network appliances, routers, switches, gateways, processors, servers, load balancers, firewalls, or any other suitable device, component, element, or object operable to affect or process electronic information in a network environment.

Figure 3:
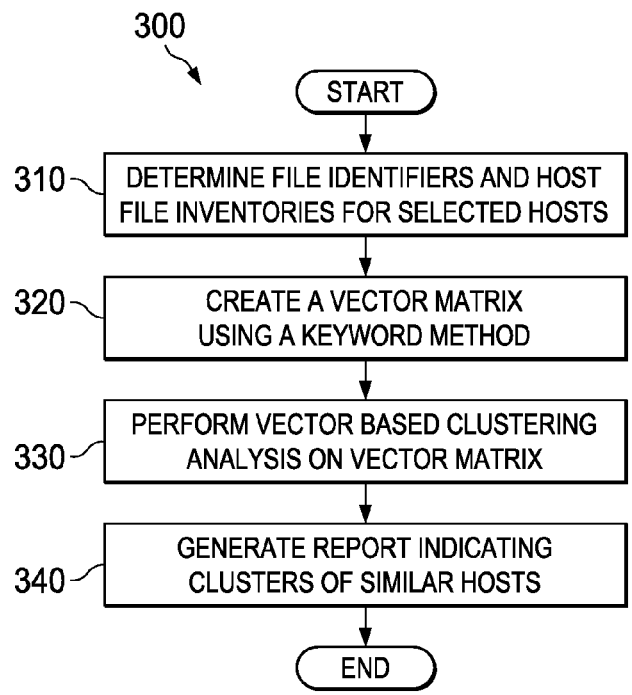
FIG. 3 is a simplified flowchart illustrating a series of example steps associated with the system in accordance with one embodiment of the present disclosure.

Turning to FIG. 3, an example system flow 300 of a keyword-based embodiment of the system and method for clustering host inventories is illustrated. Flow may begin at step 310 where host file inventories ($I_1$ through $I_n$, with n=number of selected hosts) are generated for each of the selected hosts 110. Each host file inventory can include a set of file identifiers, with each file identifier representing a different executable file in the set of executable files 112a, 112b, or 112c of the corresponding selected host 110a, 110b, or 110c. Each file identifier may include a sequence of one or more tokens associated with the executable file represented by the file identifier. In one embodiment, the user may be provided with the option of choosing the number of tokens and the configuration of each token. For example, a simple file identifier could include a single token having a checksum configuration. A checksum can be a mathematical value or hash sum (e.g., a fixed string of numerical digits) derived by applying an algorithm to an executable file. If the algorithm is applied to another executable file that is identical to the first executable file, then the checksums should match. However, if the other executable file is different in any way (e.g., different type of software program, same software program but different version, same software program that has been altered in some way, etc.), then the checksums are very unlikely to match. Thus, the same executable file stored in different hosts or stored in different locations on disk of the same host should have identical checksums.

In other examples, more complex file identifiers could be selected to provide a higher level of distinctiveness of an executable file. In one such example, a file identifier could include a sequence of first and second tokens having a checksum configuration and file path configuration, respectively, where the file path indicates where the executable file is stored on disk in the particular host in which it is installed. Thus, if identical executable files X and Y are installed on host 110a and host 110b, respectively, but are stored in different locations of memory, then the first token of the file identifier generated for executable file X on host 110a could be the same as the first token of the file identifier generated for executable file Y on host 110b. However, the second token of the file identifier generated for executable file X on host 110a could be different than the second token of the file identifier generated for executable file Y on host 110b.

Numerous other file identifiers may be configured by using any number of tokens and configuring the tokens to include any combination of available program file attributes, checksums, and/or file paths. Program file attributes may include, for example, creation date, modification date, security settings, vendor name, and the like. Although file identifiers may be configured with any number of such tokens, an executable file without a particular program file attribute, which is selected as one of the tokens, may have a file identifier with only the tokens available to that executable file. For example, if the file identifier is configured to include a first token (e.g., a checksum) and a second token (e.g., a vendor name), then an executable file without an embedded vendor name would have a file identifier with only a first token corresponding to the file checksum. In contrast, an executable file having an embedded vendor name would have a file identifier with both first and second tokens corresponding to the file checksum and vendor name, respectively.

The file identifiers and resulting host file inventories $I_1$ through $I_n$ may be provided by various implementations. In one embodiment, the file identifiers and resulting host file inventories may be generated by host inventory feeds 114 for each host 110 and pushed to central server 130. For embodiments in which a user configures the file identifier by selecting a number of tokens for the token sequence and by selecting individual token configurations, central server 130 may provide the user selected configuration criteria to each host 110. Host inventory feeds 114 may then generate file identifiers with token sequences having the particular user-selected configuration. In another embodiment, checksums for each executable file may be generated on hosts 110 by host inventory feeds 114 and then pushed to central server 130 along with other file attributes and file paths such that host inventory preparation module 150 of central server 130 can generate the file identifiers and resulting host file inventories for each of the selected hosts 110. In one embodiment, enumeration of executable files from the sets of executable files 112 of selected hosts 110 can be achieved by existing security technology such as, for example, Policy Auditor software or Application Control software, both manufactured by McAfee, Inc. of Santa Clara, Calif.

Figure 4:
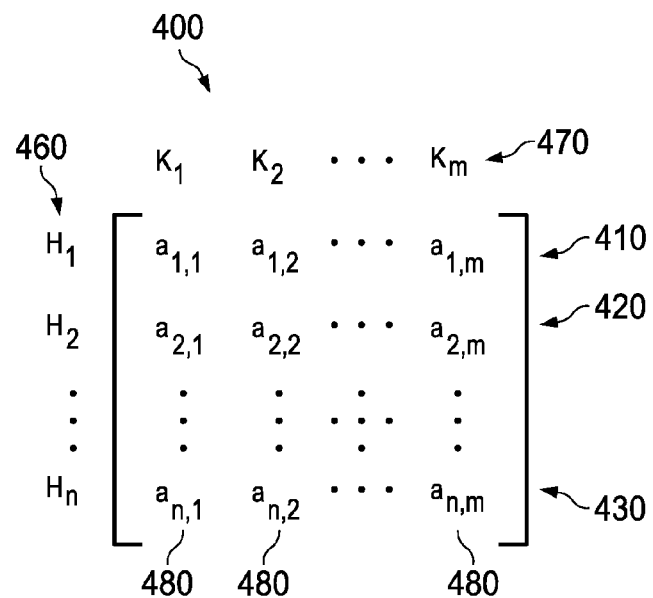
FIG. 4 illustrates an n×m vector matrix format used in accordance with an embodiment of the present disclosure.
Figure 5:
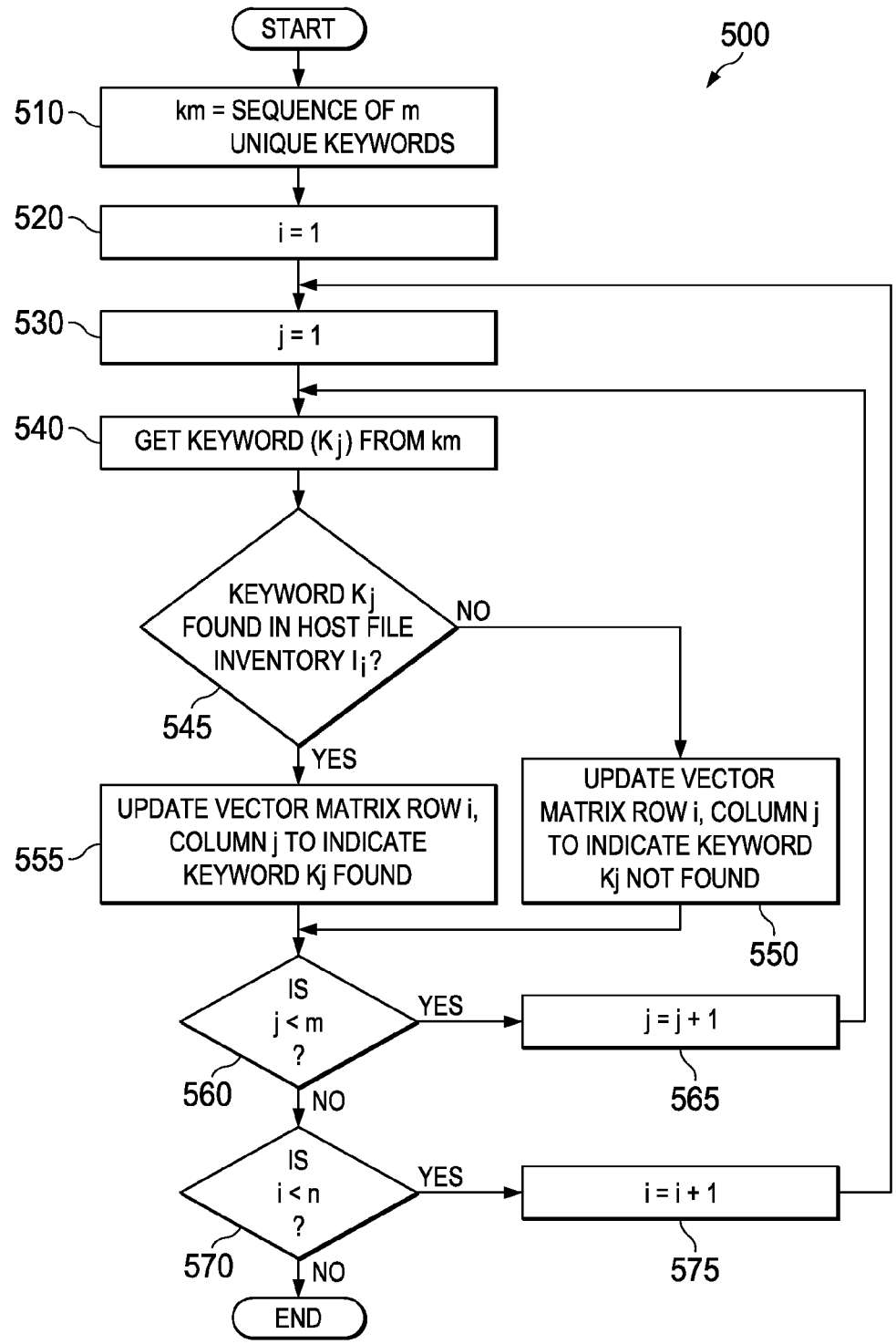
FIG. 5 is a flowchart illustrating a series of example steps for generating values for an n×m vector matrix as shown in FIG. 4 in accordance with one embodiment of the present disclosure.

Referring again to FIG. 3, after file identifiers and host file inventories have been determined for all of the selected hosts 110 in step 310, flow then moves to step 320 where a keyword method is used to transform host file inventories $I_1$ through $I_n$ into a vector matrix, which will be further described herein with reference to FIGS. 4 and 5. Once a vector matrix is created, flow moves to step 330 where a vector-based clustering analysis is performed on the vector matrix. Exemplary types of clustering analysis that may be performed on the vector matrix include agglomerative hierarchical clustering and partitional clustering. The results of such clustering techniques may be stored in a memory element of central server (e.g., secondary storage 240 of computer 200), or may be stored in a database or other memory element external to central server 130.

After vector-based clustering has been performed on the vector matrix in step 330, flow moves to step 340 where one or more reports can be generated indicating the clustered groupings determined during the clustering analysis and can be provided to authorized users by various methods (e.g., screen displays, electronic files, hard copies, emails, etc.). Exemplary reports may include a textual report and/or a visual representation (e.g., a proximity plot, a dendrogram, heat maps of a permuted keyword matrix, heat maps of a reduced keyword matrix where rows and columns have been merged to illustrate clusters, other cluster plots, etc.) enabling the user to view logical groupings of the selected hosts. For example, after the clustering analysis has been performed, a graphical user interface of management console 170 may display a proximity plot having physical representations of each host, with identifiable logical groupings (e.g., uniquely colored groupings, circled or otherwise enclosed groupings, representations of groupings with connected lines, etc.). Once the similar groupings and outlier hosts have been identified, an IT Administrator or other authorized user can apply common policies to hosts within the logical groupings and remedial action may be taken on any identified outlier hosts. For example, outlier hosts may be remediated to a standard software configuration as defined by the IT Administrators.

Turning to FIG. 4, FIG. 4 illustrates a matrix format 400 used when generating a vector matrix in one embodiment of the system and method of clustering host inventories. In this embodiment, host file inventories are transformed into a vector matrix in Euclidean space using a keyword method. The following variables may be identified when generating a vector matrix:

n=number of selected hosts
m=number of keywords
$H_i$=host in network, with i=1 to n
    (e.g., $H_1$=host 110a, $H_2$=host 110b, $H_3$=host 110c)
$K_j$=unique keyword, with j=1 to m
$I_i$=host file inventory on $H_i$, with i=1 to n The number of keywords associated with an executable file equals the number of tokens in the token sequence of the file identifier representing the executable file. Therefore, one or more keywords can be associated with each executable file in sets of executable files 112 of selected hosts 110. In addition, each keyword could be associated with multiple executable files in the same or different hosts. Thus, a keyword sequence km may be defined as a sequence of unique keywords $K_1$ through $K_m$, where each keyword is associated with one or more executable files in sets of executable files 112 of all selected hosts 110.

Vector matrix format 400 includes n rows 460 and m columns 470, with n and m defining the dimensions of the resulting n-by-m (i.e., n×m) vector matrix. Each row of vector matrix format 400 is denoted by a unique host $H_i$ (i=1 to n), and each column is denoted by a unique keyword $K_j$ (j=1 to m) of keyword sequence km. Each entry 480 is denoted by a variable with subscripts i and j (i.e., $a_{i,j}$) where i and j correspond to the respective row and column where the entry is located. For example, entry $a_{2,1}$ is found in row 2, column 1 of vector matrix format 400. Each row of entries represents a row vector 410, 420, and 430 for its corresponding host $H_1$, $H_2$ and $H_n$. For example, $a_{1,1}$, $a_{1,2}$, through $a_{1,m}$ define row vector 410 for host $H_1$. Once each of the entries 480 has been filled with a determined value, row vectors 410, 420, through 430 can be provided as input data to a vector-based clustering algorithm to create a cluster graph or plot showing logical groupings of hosts $H_1$ through $H_n$, having similar inventories of executable files and any host outliers having dissimilar host inventories.

Turning to FIG. 5, FIG. 5 illustrates a flow 500 using a keyword method to transform host file inventories into a list of vectors in Euclidean space, represented by vector matrix format 400. Flow 500 corresponds to step 320 in flow 300 of FIG. 3 and may be implemented, at least in part, by host inventory preparation module 150 of central server 130 shown in FIG. 1. Flow may begin at step 510 to determine keyword sequence km, which is a sequence of m unique keywords (km=$K_1$, $K_2$, ... $K_m$) and is a basis for m-dimensional keyword space. In one embodiment, to determine km the file identifiers of all host file inventories of selected hosts 110 can be evaluated to find each unique keyword. In one example, each of the file identifiers of the host file inventories ($I_1$ through $I_n$) includes a sequence of first and second tokens with the first token having a file checksum configuration and the second token having a file path configuration. If the same version of Microsoft® Word software is installed on each of the selected hosts 110a, 110b, and 110c in the same location on disk, then each file identifier representing the Microsoft® Word software in each of the host file inventories includes a first token containing a checksum of the Microsoft® Word software and a second token containing a file path of the software. In this example, keyword sequence km could include a first keyword ($K_1$) containing the checksum, which is the same on each of the selected hosts 110a, 110b, and 110c, and a second keyword ($K_2$) containing the file path, which is the same on each of the selected hosts 110a, 110b, and 110c.

Once keyword sequence km has been determined, the algorithm of flow 500 computes a list of position vectors for an n×m vector matrix. Variables 'i' and 'j' are used to construct the vector matrix having n×m vector matrix format 400, in m-dimensional keyword space, for each host $H_i$ by iterating over j through km and producing appropriate values for the position vectors indicating whether each host file inventory $I_i$ contains each keyword $K_j$.

The iterative flow to find keywords of keyword sequence km in file identifiers of host inventories is illustrated in steps 520 through 575 of FIG. 5. In step 520, variable i is set to 1 and steps 530, 570, and 575 form an outer loop iterating through the hosts. Variable j is set to 1 in step 530 and steps 540 through 565 form an inner loop iterating over j through km. After variables i and j are set to 1, flow moves to step 540 where keyword $K_j$ is retrieved. Flow moves to decision box 545 where a query is made as to whether keyword $K_j$ is found in host file inventory $I_i$ of host $H_i$. Thus, host file inventory $I_i$ of host $H_i$ is searched for a file identifier containing keyword $K_j$. If keyword $K_j$ is not found in host file inventory $I_i$ then flow moves to step 550 where row i, column j (i.e., $a_{i,j}$) in the vector matrix may be updated with an appropriate value indicating keyword $K_j$ was not found in host file inventory $I_i$. However, if in step 545, keyword $K_j$ is found in host file inventory $I_i$, then flow moves to step 555 where row i, column j (i.e., $a_{i,j}$) in the vector matrix may be updated with an appropriate value indicating keyword $K_j$ was found in host file inventory $I_i$.

The values of entries $a_{i,j}$ in the vector matrix, which indicate whether keyword $K_j$ is found in a host file inventory $I_i$, may vary depending upon the particular implementation of the system. In one embodiment, an entry $a_{i,j}$ is assigned a '1' value in step 555, indicating keyword $K_j$ was found in host file inventory $I_i$, or a '0' value in step 560, indicating keyword $K_j$ was not found in host file inventory $I_i$. Thus, in this embodiment, vector matrix contains only '0' and/or '1' values. In another embodiment, entry $a_{i,j}$ is assigned a value in step 555 or 550 corresponding to a frequency of occurrence of keyword $K_j$ in host file inventory $I_i$. For example, assume file identifiers in a host file inventory $I_1$ include a first token configured as a checksum and a second token configured as a vendor name, with three executable files on host $H_1$ having the same embedded vendor name, XYZ, resulting in keyword $K_2$ of keyword sequence km being assigned the embedded vendor name XYZ. In this embodiment, when host file inventory $I_1$ of host $H_1$ is searched for keyword $K_2$, entry $a_{1,2}$ could be updated with a value of 3 because of the three occurrences of vendor name XYZ in file identifiers of host file inventory $I_1$. Thus, in this embodiment, vector matrix may contain '0' values and/or positive integer values.

After row i, column j is filled with an appropriate value in step 555 or 550, flow moves to decision box 560 where a query is made as to whether j<m. If j<m, then host file inventory $I_i$ of host $H_i$ has not been checked for all of the keywords in km. Therefore, flow moves to step 565 where j is set to j+1, and flow loops back to step 540 to get the next keyword $K_j$ (with j=j+1) in km and search for $K_j$ in host file inventory $I_i$. If, however, in decision box 560 it is determined that j is not less than m (i.e., j≥m), then host file inventory $I_i$ has been searched for all of the keywords $K_1$ through $K_m$ in keyword sequence km, so flow moves to decision box 570, which is part of the outer loop of flow 500. A query is made in decision box 570 to determine whether i<n, and if i<n, then not all of the hosts have been evaluated to generate corresponding keyword vectors. Therefore, flow moves to step 575 where i is set to i+1, and flow loops back to step 530. In step 530, j is set to 1 again, so that a vector for the next host $H_i$ (with i=i+1) can be generated by inner loop steps 540 through 565. With reference again to decision box 570, if i is not less than n (i.e., i≥n), then all of the hosts $H_1$ through $H_n$ have been evaluated such that all of the vectors have been created in n×m vector matrix and, therefore, the flow ends.

The embodiment of the flow 500 shown in FIG. 5 creates a vector in keyword space successively for each host $H_1$ through $H_n$. Other embodiments, however, could be configured to switch the inner and outer loops in flow 500 such that for each keyword $K_j$, a column of vector matrix entries is produced by iterating over i through hosts $H_i$ and producing an appropriate value when keyword $K_j$ is found in host file inventory $I_i$ of host $H_i$ and an appropriate value when $K_j$ is not found in host file inventory $I_i$ of host $H_i$. This processing could be repeated until all columns are filled, thereby generating the list of vectors in rows 1 through n.

The clustering analysis performed on the resulting vector matrix may include commonly available clustering techniques such as agglomerative hierarchical clustering or partitional clustering. In agglomerative hierarchical clustering, each element begins as a separate cluster and elements are merged into successively larger clusters, which may be represented in a tree structure called a dendrogram. A root of the tree represents a single cluster of all of the elements and the leaves of the tree represent separated clusters of the elements. Generally, merging schemes in agglomerative hierarchical clustering used to achieve logical groupings may include schemes well-known in the art such as single-link (i.e., the distance between clusters is equal to the shortest distance from any member of one cluster to any member of another cluster), complete-link (i.e., the distance between clusters is equal to the greatest distance from any member of one cluster to any member of another cluster), group-average (i.e., the distance between clusters is equal to the average distance from any member of one cluster to any member of another cluster), and centroid (i.e., the distance between clusters is equal to the distance from the center of any one cluster to the center of another cluster).

Known techniques may be implemented in which predetermined similarity criteria sets the point at which clustering is halted (e.g., cut point determination). Cut point determination may be made, for example, at a specified level of similarity or when consecutive similarities are the greatest, which is known in the art. As an example, a tree structure representing clusters could be cut at a predetermined height resulting in more or less clusters depending on the selected height at which the cut is made. Cut point determinations may be determined based on a particular network environment or particular hosts being clustered. In one example embodiment, an IT administrator or other authorized user could define the cut point determination used by the clustering procedure by determining a desired threshold for similarity based on the particular network environment.

In other embodiments, partitional clustering may be used. Partitional clustering typically involves an algorithm that determines all clusters at one time. In partitional clustering, predetermined similarity criteria may provide, for example, a selected number of clusters to be generated or a maximum diameter for the clusters. One exemplary software package that implements these various clustering techniques is CLUTO Software for Clustering High-Dimensional Datasets developed by George Karypis, Professor at the Department of Computer Science & Engineering, University of Minnesota, Minneapolis and Saint Paul, Minn., which may be found on the World Wide Web at http://glaros.dtc.umn.edu/gkhome/view/cluto.

Figure 6:
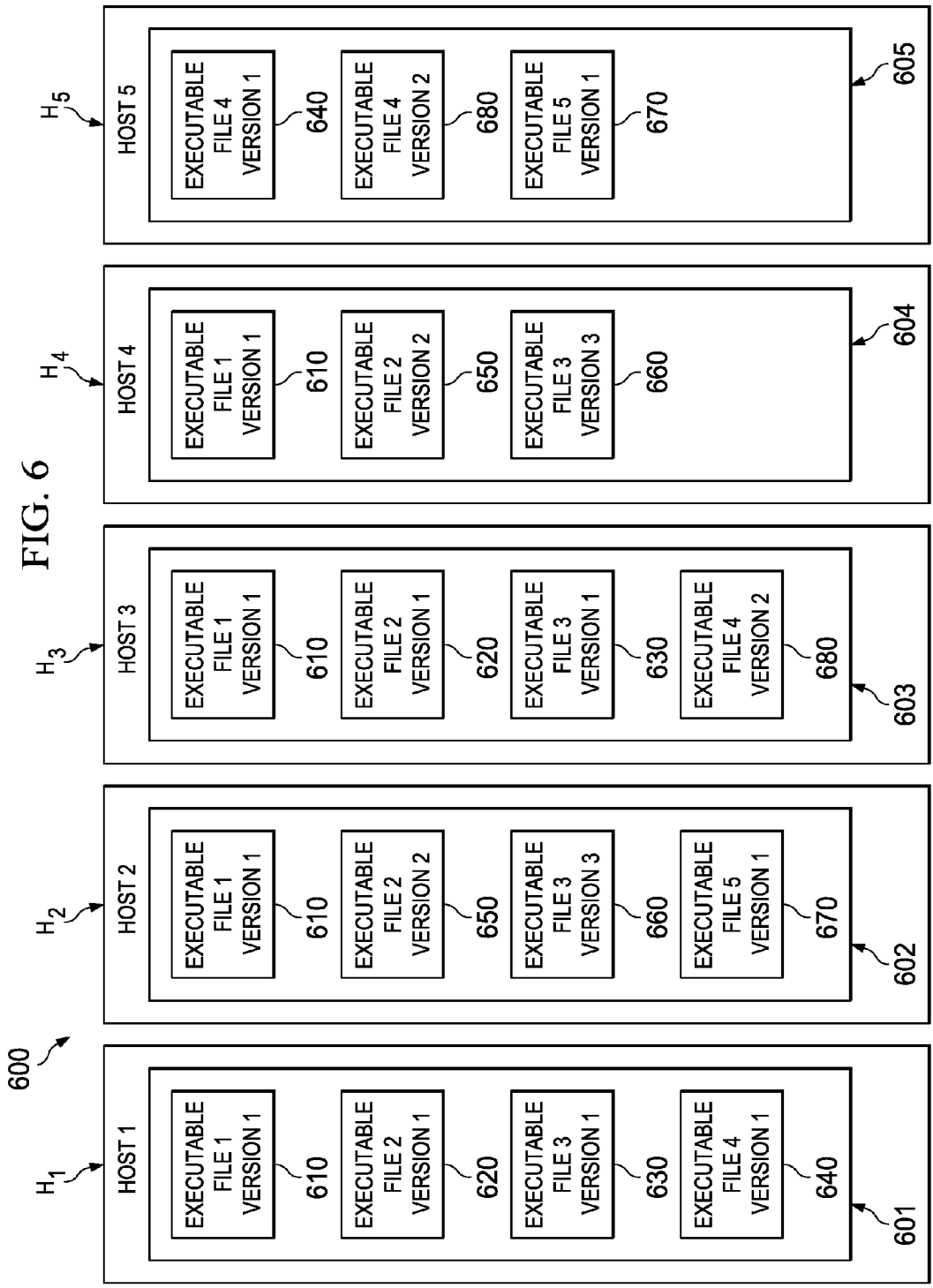
FIG. 6 illustrates an example selected group of hosts in a network environment to which embodiments of the present disclosure may be applied.
Figures 7, 8:
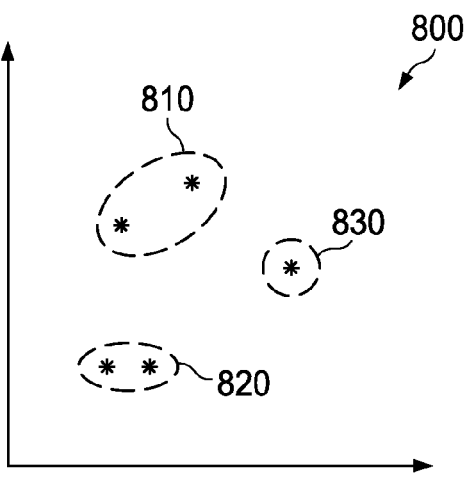
FIG. 7 illustrates a vector matrix created by application of the flow of FIG. 5 to the example selected group of hosts of FIG. 6.
FIG. 8 is an example cluster diagram of the hosts of FIG. 6 that could be created from the system in accordance with embodiments of the present disclosure.

Turning to FIGS. 6, 7, and 8, an example selected plurality of hosts 600 with executable files, a vector matrix 700 generated using the executable files of selected hosts 600, and an example resulting cluster plot 800 are illustrated, respectively. In FIG. 6, host 1 ($H_1$) is shown with a set of executable files 601 including executable files 610, 620, 630, and 640. Host 2 ($H_2$) is shown with a set of executable files 602 including executable files 610, 650, 660, and 670. Host 3 ($H_3$) is shown with a set of executable files 603 including executable files 610, 620, 630, and 680. Host 4 ($H_4$) is shown with a set of executable files 604 including executable files 610, 650, and 660. Host 5 ($H_5$) is shown with a set of executable files 605 including executable files 640, 670, and 680.

FIG. 7 illustrates the resulting vector matrix 700 after the keyword method of flow 500 has been applied to the sets of executable files 601 through 605 of the selected plurality of hosts 600 of FIG. 6. Vector matrix 700 shows hosts 1 through 5 ($H_1$ through $H_5$) corresponding to rows 760 containing keyword vectors 710, 720, 730, 740, and 750, respectively. Columns 770 of vector matrix 700 are designated by keywords $K_1$ through $K_8$. In this example vector matrix 700, entries 780 include a '1' indicating that keyword $K_j$ is contained in a file identifier of host file inventory $I_i$, or a '0' indicating that keyword $K_j$ is not contained in a file identifier of host file inventory $I_i$.

In the example scenario of applying the keyword method of flow 500 to the sets of executable files 601 through 605 of selected plurality of hosts 600 in order to create vector matrix 700, the following variables may be identified:
n=5 (host computers)
$H_1$ through $H_5$=hosts in network (e.g., $H_1$=host 1, $H_2$=host 2, etc.)
$I_1$ through $I_5$=host file inventories representing sets of executable files 601 through 605, respectively
m=8 (keywords)
$K_1$ through $K_8$=unique keywords Each of the host file inventories $I_1$ through $I_5$ includes a set of file identifiers representing one of the sets of executable files 601, 602, 603, 604, and 605, respectively. Each executable file in a set of executable files is represented by a separate file identifier in the particular host file inventory. In this exemplary scenario, file identifiers each include a first token having a checksum configuration. Unique keywords are determined among all sets of executable files of selected hosts $H_1$ through $H_5$. Thus, 8 unique keywords may be determined for selected hosts 600:
$K_1$=checksum for executable file 610
$K_2$=checksum for executable file 620
$K_3$=checksum for executable file 630
$K_4$=checksum for executable file 640
$K_5$=checksum for executable file 650
$K_6$=checksum for executable file 660
$K_7$=checksum for executable file 670
$K_8$=checksum for executable file 680

A keyword sequence km can then be created in step 520 with the 8 unique keywords:
km=$K_1 K_2 K_3 K_4 K_5 K_6 K_7 K_8$ Thus, in this example scenario, the following host file inventories $I_1$ through $I_5$ could include file identifiers having first tokens equivalent to the following keywords:
$I_1 \rightarrow K_1, K_2, K_3, K_4$
$I_2 \rightarrow K_1, K_5, K_6, K_7$
$I_3 \rightarrow K_1, K_2, K_3, K_8$
$I_4 \rightarrow K_1, K_5, K_6$
$I_5 \rightarrow K_4, K_7, K_8$ Once keyword sequence km is determined, flow moves to step 520 where variable i is set to 1 and then the iterative flow begins to create n×m (5×8) vector matrix 700 shown in FIG. 7. In step 530, variable j is set to 1 and keyword $K_j$ ($K_1$) is retrieved from km in step 540. Flow moves to decision box 545 where host file inventory $I_i$ ($I_1$) of host $H_i$ ($H_1$) is searched for keyword $K_j$ ($K_1$). In this example, keyword $K_1$ is found in host file inventory $I_1$ of host $H_1$, so flow moves to step 555 where a '1' entry is added to row i, column j (row 1, column 1) of vector matrix 700. After vector matrix 700 has been updated flow moves to decision box 560 where a query is made as to whether j<m. Since 1 is less than 8, the flow moves to step 565 where j is set to 2 (i.e., j=j+1). Flow then loops back to step 540 to search for the next keyword $K_j$ ($K_2$) in host file inventory $I_1$ ($I_1$) of host $H_i$ ($H_1$). In this case, keyword $K_2$ is found in host file inventory $I_1$, so a '1' entry is added to row i, column j (row 1, column 2) of vector matrix 700. The variable j is still less than 8, (i.e., 2<8) as determined in decision box 560, so flow moves to step 565 and j is set to 3 (i.e., j=j+1). This iterative processing continues for each value of j until j=8, thereby filling in each entry 780 of keyword vector 710 for host $H_i$ ($H_1$).

After the last entry 780 of keyword vector 710 has been added to vector matrix 700, flow moves to decision box 560 where a query is made as to whether j<m (i.e., Is 8<8?). Because j is not less than 8, flow moves to decision box 570 where a query is made as to whether i<n (i.e., Is 1<5?). Because 1 is less than 5, flow moves to step 575 where i is set to 2 (i.e., i=i+1) and flow loops back to step 530 where j is set to 1. The inner iterative loop then begins in step 540 to search for all keywords in host file inventory $I_i$ ($I_2$) of host $H_i$ ($H_2$) beginning with keyword $K_j$ ($K_1$). Thus, in the embodiment used in this example scenario, rows 760 are successively filled with a '1' or a '0' value for each entry $a_{i,j}$ until each vector row 710 through 750 has been completed. As previously discussed herein, however, another embodiment provides that each entry $a_{i,j}$ in rows 760 could be filled with a value corresponding to the frequency of occurrence of keyword $K_j$ found in host file inventory $I_i$.

Vector matrix 700 can be provided as input data to a vector based clustering procedure, as previously described herein. Information generated from the clustering procedure could be provided in numerous ways such as, for example, reports, screen displays, files, emails, etc. In one example, the information could be provided in a proximity plot such as example proximity plot 800 illustrated in FIG. 8. Proximity plot 800 is an example graph that could be created by a vector-based clustering procedure applied to vector matrix 700 of FIG. 7. If agglomerative hierarchical clustering is used, clusters 810, 820, and 830 may be determined based on a cut point determination. If partitional clustering is used, clusters 810, 820, and 830 may be generated based on a predetermined number of clusters. Proximity plot 800 shows two clusters and one outlier. Cluster 810 represents hosts $H_1$ and $H_3$ and cluster 820 represents hosts $H_2$ and $H_4$. Hosts $H_1$ and $H_3$ may be clustered together because they have three common executable files 610, 620, and 630. Hosts $H_2$ and $H_4$ may be clustered together because they also have three common executable files 610, 650, and 660. Outlier 830 represents host $H_5$, which may be indicated as an outlier, because it has, in this example, none or only one common executable file with each of the other hosts. Although the clustering information is displayed on proximity plot 800 shown in FIG. 8, other textual reports and/or visual representations, as previously described herein with reference to FIG. 3, may be used to show clusters 810 and 820 and outlier 830.

Figure 9:
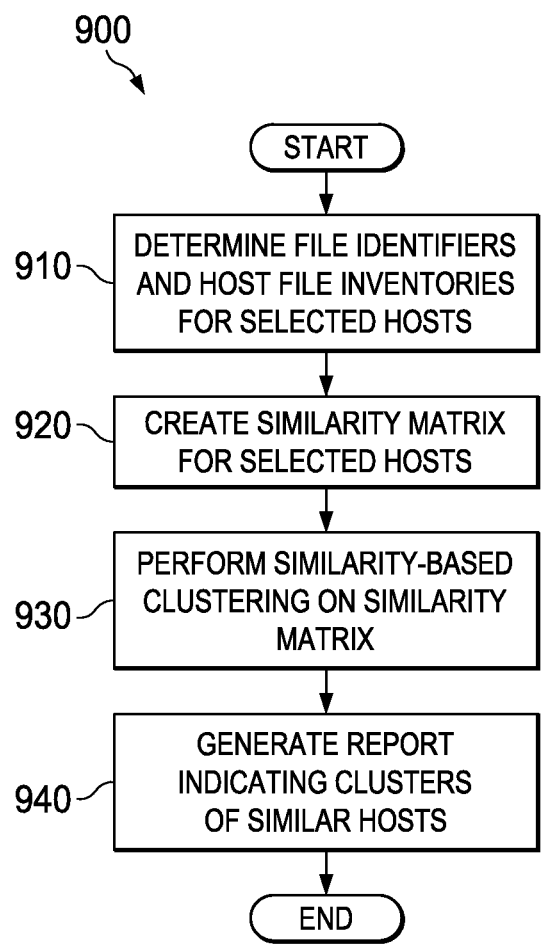
FIG. 9 is a simplified flowchart illustrating a series of example steps associated with the system in accordance with another embodiment of the present disclosure.

Turning to FIG. 9, FIG. 9 illustrates an example system flow 900 of a compression-based embodiment of a system and method for clustering host inventories. Flow may begin at step 910 where file identifiers and host file inventories ($I_1$ through $I_n$, with n=number of selected hosts) may be generated for each of the selected hosts 110, as previously described herein with reference to FIG. 3.

Figure 11:
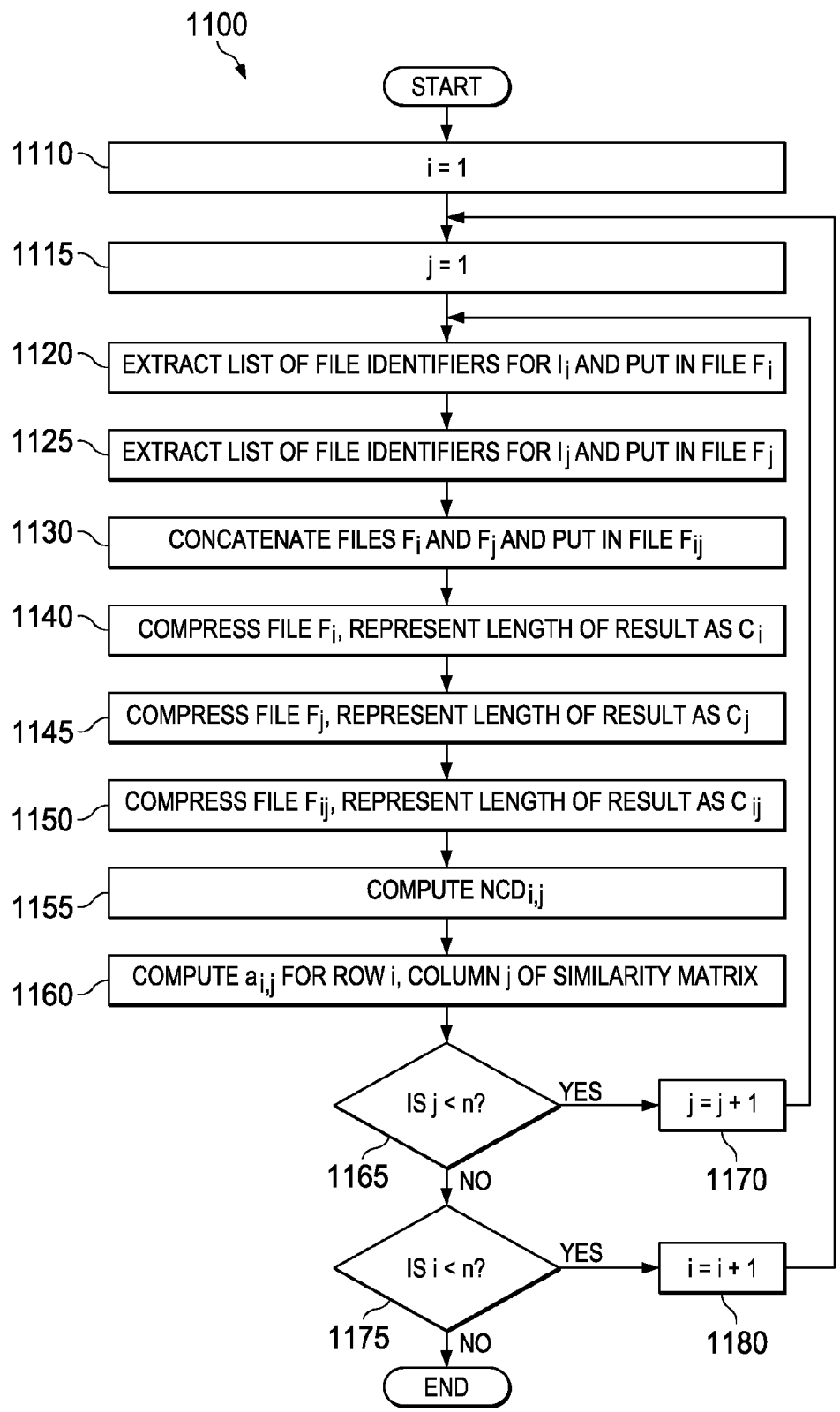
FIG. 11 is a flowchart illustrating a series of example steps for generating values for an n×n similarity matrix as shown in FIG. 10 in accordance with one embodiment of the present disclosure.

After file identifiers and host file inventories have been determined for each of the selected hosts 110, flow then moves to step 920 where a compression technique may be used to transform host file inventories into a similarity matrix, which will be further described herein with reference to FIGS. 10 and 11. Once a similarity matrix is created, flow moves to step 930 where a similarity-based clustering analysis can be performed on the similarity matrix. The similarity-based clustering analysis performed on the similarity matrix may include, for example, agglomerative hierarchical clustering or partitional clustering. The results of such clustering techniques may be stored in a memory element of central server (e.g., secondary storage 240 of computer 200), or may be stored in a database or other memory element external to central server 130.

After similarity-based clustering has been performed on the similarity matrix in step 930, flow moves to step 940 where one or more reports can be generated indicating the clustered groupings determined during the clustering analysis, as previously described herein with reference to FIG. 3. Such reports for similarity-based clustering may include a textual report and/or a visual representation (e.g., a proximity plot, a dendrogram, heat maps of a similarity matrix where rows and columns have been merged to illustrate clusters, other cluster plots, etc.) enabling the user to view logical groupings of the selected hosts. Once the similar groupings and outlier hosts have been identified, an IT Administrator or other authorized user can apply common policies to computers within the logical groupings and remedial action may be taken on any identified outlier computers. For example, outlier computers may be remediated to a standard software configuration as defined by the IT Administrators.

Turning to FIG. 10, FIG. 10 illustrates a matrix format 1000 used when generating a similarity matrix in one embodiment of the system and method of clustering host inventories. The similarity matrix is generated by applying a compression method to a plurality of host file inventories, each of which includes a set of file identifiers. As an example, each of the sets of file identifiers may represent one of the sets of executable files 112a, 112b, or 112c on the corresponding selected host 110a, 110b, or 110c. In addition, the following variables may be identified when generating a similarity matrix:

n=number of selected hosts
$H_i$=host in network, with i=1 to n (e.g., $H_1$=host 110a, $H_2$=host 110b, $H_3$=host 110c)
$H_j$=host in network, with j=1 to n (e.g., $H_1$=host 110a, $H_2$=host 110b, $H_3$=host 110c)
$I_i$=host file inventory of $H_i$
$I_j$=host file inventory of $H_j$ Similarity matrix format 1000 includes n rows 1060 and n columns 1070, with 'n' defining the number of dimensions of the resulting n-by-n (i.e., n×n) similarity matrix. Each row of similarity matrix format 1000 is denoted by host $H_i$ (i=1 to n), and each column is denoted by host $H_j$ (j=1 to n). Each entry 1080 is denoted by a variable with subscripts i and j (i.e., $a_{i,j}$) where i and j correspond to the respective row and column where the entry is located. For example, entry $a_{2,1}$ is found in row 2, column 1 of similarity matrix format 1000.

When a similarity matrix is created in accordance with one embodiment of this disclosure, each entry $a_{i,j}$ has a numerical value representing the similarity distance between host $H_i$ and host $H_j$ with 1 representing the highest degree of similarity. In one embodiment, the similarity distances represented by entries $a_{1,1}$ through $a_{n,n}$ can include any numerical value from 0 to 1, inclusively (i.e., $0 \leq a_{i,j} \leq 1$). In this embodiment, the closer $a_{i,j}$ is to 1, the greater the similarity is between host file inventories $I_i$ and $I_j$ of hosts $H_i$ and $H_j$, and the closer $a_{i,j}$ is to zero, the greater the difference is between host file inventories $I_i$ and $I_j$ of hosts $H_i$ and $H_j$. Thus, a value of 1 in $a_{i,j}$ may indicate hosts $H_i$ and $H_j$ have identical host file inventories and therefore, identical sets of executable files, whereas a value of zero in $a_{i,j}$ may indicate hosts $H_1$ and $H_j$ have no common file identifiers in their respective host file inventories and therefore, no common executable files in their respective sets of executable files. Once each of the entries 1080 has been filled with a calculated value, the resulting similarity matrix can be provided as input data into a similarity-based clustering algorithm to create a cluster graph or plot showing logical groupings of hosts $H_1$ through $H_n$ having similar sets of executable files and outlier hosts having dissimilar sets of executable files. The clustering analysis performed on the resulting similarity matrix may include commonly available clustering techniques such as agglomerative hierarchical clustering or partitional clustering, as previously described herein with reference to clustering analysis of a vector matrix.

Turning to FIG. 11, FIG. 11 illustrates a flow 1100 using a compression method to transform host file inventories $I_1$ through $I_n$ of hosts $H_1$ through $H_n$, respectively, into a similarity matrix. Flow 1100 corresponds to step 920 of FIG. 9 and may be implemented, at least in part, by host inventory preparation module 150 of central server 130, shown in FIG. 1. When flow 1100 begins, i is set to 1 in step 1110 and j is set to 1 in step 1115. Variables 'i' and 'j' are used to construct the n×n similarity matrix for the selected plurality of hosts being clustered. Steps 1115, 1175, and 1180 form an outer loop iterating through the rows of hosts and steps 1120 through 1170 form an inner loop iterating through the columns of hosts.

In step 1120, a list of file identifiers (e.g., checksums, checksums combined with a file path, checksums combined with one or more file attributes, etc.) representing a set of executable files on host $H_i$ are extracted from host file inventory $I_i$ and put in a file $F_i$. In step 1125, a list of file identifiers representing a set of executable files on host $H_j$ are extracted from host file inventory $I_j$ and put in a file $F_j$. In step 1130, files $F_i$ and $F_j$ are concatenated and put in file $F_{ij}$. It will be apparent that the use of files $F_i$, $F_j$, and $F_{ij}$ to store file identifiers is an example implementation of the system, and that memory buffers or any other suitable representation allowing concatenation, compression, and length determination of data may also be used.

After files $F_i$, $F_j$, and $F_{ij}$ are prepared, compression is applied to each of the files. A compression utility such as, for example, gzip, bzip, bzip2, zlib, or zip compression utilities may be used to compress files $F_i$, $F_j$, and $F_{ij}$. Also, in some embodiments, the list of file identifiers in files $F_i$, $F_j$, and $F_{ij}$ may be sorted to enable more accurate compression by the compression utility. In step 1140, file $F_i$ is compressed and the length of the result is represented as $C_i$. In step 1145, file $F_j$ is compressed and the length of the result is represented as $C_j$. In step 1150, file $F_{ij}$ is compressed and the length of the result is represented as $C_{ij}$. After compressing each of the files, normalized compression distance ($NCD_{i,j}$) between $H_i$ and $H_j$ is computed in step 1155.

Normalized compression distance (NCD) is used for clustering and is based on an algorithm developed by Kolmogorov called normalized information distance (NID). NCD is discussed in detail in Rudi Cilibrasi's 2007 thesis entitled "Statistical Interference through Data Compression," which may be found at http://www.illc.uva.nl/Publications/Dissertation/DS-2007-01.text.pdf and can be used to compute the distance between similar data. NCD may be computed using the following equation:

$$NCD_{i,j} = [C_{ij} - \min\{C_i, C_j\}]/\max\{C_i, C_j\}$$

Once $NCD_{i,j}$ has been computed, flow moves to step 1160 where $a_{i,j}$ is computed by the following equation: $a_{i,j} = 1 - NCD_{i,j}$. The value $a_{i,j}$ is then used to construct the similarity matrix by adding $a_{i,j}$ to row i, column j. After the similarity matrix has been updated in step 1160, flow moves to decision box 1165 and a query is made as to whether j<n. If j<n, then additional entries in row i of the similarity matrix need to be computed (i.e., similarity distance has not been computed between host $H_i$ and all of the hosts $H_j$ (j=1 to n). In this case, flow moves to step 1170 where j is set to j+1. Flow then loops back to step 1120 where the inner loop of flow 1100 repeats and the similarity distance is computed between host $H_i$ and the next host $H_j$ with j=j+1.

With reference again to decision box 1165, if j is not less than n (i.e., j≥n), then all of the entries in row i have been computed and flow moves to decision box 1175 where a query is made as to whether i<n. If i<n, then not all rows of similarity matrix 1000 have been computed, and therefore, flow moves to step 1180 where i is set to i+1. Flow then loops back to step 1115 where j is set to 1 so that entries $a_{i,j}$ for the next row i ($H_i$, with i=i+1) can be generated by inner loop steps 1120 through 1170. With reference again to decision box 1175, if i is not less than n (i.e., i≥n) then entries for all of the rows i through n have been computed and, therefore, the similarity matrix has been completed and flow ends.

It will be apparent that flow 1100 could be optimized in numerous ways. One optimization technique includes caching the lengths of compressed files $C_i$ and $C_j$, which are used multiple times during flow 1100 to calculate entries 1080 in the similarity matrix. In addition, the extracted lists of file identifiers $F_i$ and $F_j$ may also be cached for use during flow 1100. It will also be noted that the matrix should be symmetric along the diagonal $a_{1,1}$ through $a_{n,n}$. This symmetry could be used in the implementation of the system to compute only one-half of the matrix and then reflect the results over the diagonal.

Turning to 12, FIG. 12 shows an example similarity matrix 1200 generated by applying the compression method of flow 1100 of FIG. 11 to host file inventories $I_1$ through $I_5$ of the example selected plurality of hosts 600 of FIG. 6. FIG. 12 shows hosts 1 through 5 ($H_1$ through $H_5$) corresponding to rows 1260 and columns 1270, forming a 5×5 similarity matrix 1200. Entries 1280 of similarity matrix 1200 include values from 0 to 1, inclusively. The closer the value is to 1, the closer the distance or greater the similarity of the corresponding hosts in row i, column j. For example, each entry in matrix 1200 with the same host in the corresponding row and column, (e.g, $a_{1,1}$, $a_{2,2}$, $a_{3,3}$, etc.) has a value of 1 because the hosts, and therefore the host file inventories, are identical. In contrast, each entry in similarity matrix 1200, in which the corresponding hosts $H_i$ and $H_j$ have respective executable file inventories $I_i$ and $I_j$ with no common executable files, has a value of zero (e.g., $a_{5,4}$, $a_{4,5}$).

Applying the compression method flow 1100 of FIG. 11 to the example selected plurality of hosts 600 of FIG. 6, in order to transform host file inventories into similarity matrix 1200, the following variables can be identified:

n=5 (hosts)
$H_1$ through $H_5$=hosts in network (e.g., $H_1$=host 1, $H_2$=host 2, etc.)
$I_1$ through $I_5$=host file inventories representing sets of executable files 601 through 605, respectively Each of the host file inventories $I_1$ through $I_5$ includes a set of file identifiers representing one of the sets of executable files 601, 602, 603, 604, and 605. Each executable file in a set of executable files is represented by a separate file identifier in the particular host file inventory. In this example scenario in which each file identifier includes a single token having a checksum configuration, the following host file inventories of hosts $H_1$ through $H_5$ could include file identifiers $D_1$ through $D_8$, which represent executable files 610 through 680, respectively:

$I_1 \rightarrow D_1, D_2, D_3, D_4$
$I_2 \rightarrow D_1, D_5, D_6, D_2$ $I_3 \rightarrow D_1, D_2, D_3, D_8$
$I_4 \rightarrow D_1, D_5, D_6$
$I_5 \rightarrow D_4, D_7, D_8$ In step 1110, i is set to 1 and then the iterative looping begins to create an n×n (5×5) similarity matrix 1200 shown in FIG. 12. In step 1115 j is set to 1 and flow passes to steps 1120 through 1125 where the following variables can be determined:

$F_i(F_1) = D_1D_2D_3D_4$ (i.e., list of file identifiers for $I_i(I_1)$)
$F_j(F_1) = D_1D_2D_3D_4$ (i.e., list of file identifiers for $I_j(I_1)$)
$F_{ij}(F_1F_1) = D_1D_2D_3D_4D_1D_2D_3D_4$ (i.e., concatenated files $F_i(F_1)$ and $F_j(F_1)$)

Flow then moves to steps 1140 through 1150 where compression is applied to these files and the length of the compressed files is represented as follows:

$C_i(C_1)$ = length of compressed file $F_i(F_1)$
$C_j(C_1)$ = length of compressed file $F_j(F_1)$
$C_{ij}(C_1C_1)$ = length of compressed file $F_{ij}(F_1F_1)$ For simplicity of explanation, example arbitrary values are provided in which each file identifier has a defined length of 1, such that $C_1=4$ and $C_1C_1=4$. It will be apparent, however, that these values are provided for example purposes only and may not accurately reflect actual values produced by a compression utility. After compression has been applied to the files, $NCD_{i,j}$ is computed using the compressed values $C_i$, $C_j$, and $C_{ij}$. In this example, $$NCD_{1,1} = [C_1C_1 - \min\{C_1, C_1\}]/\max\{C_1, C_1\}$$
$$= [4 - \min\{4, 4\}]/\max\{4, 4\}$$
$$= 0$$

After the $NCD_{1,1}$ value is computed in step 1155, flow moves to step 1160 and $a_{i,j}$ is computed:

$$a_{1,1} = 1 - NCD_{1,1}$$
$$= 1 - 0$$
$$= 1$$

The '1' value is added to row i, column j (row 1, column 1) of similarity matrix 1200. After similarity matrix 1200 has been updated, flow moves to decision box 1165 where a query is made as to whether j<n. Since 1 is less than 5, flow moves to step 1170 where j is set to 2 (i.e., j=j+1). Flow then loops back to step 1120 to determine the similarity distance between $H_i$ ($H_1$) and the next host $H_j$ ($H_2$). In this case, after extraction and compression are performed, $NCD_{i,j}$ ($NCD_{1,2}$) is computed as 0.75, because $H_1$ and $H_2$ have only one common file identifier $D_1$ and, therefore, only one common executable file 601. In step 1160, $NCD_{1,2}$ is used to compute $a_{1,2}$ as 0.25, which is added to row i, column j (row 1, column 2) of similarity matrix 1200. The variable j is still less than 5, (i.e., 2<5) as determined in decision box 1165, so flow moves to step 1170 and j is set to 3 (i.e., j=j+1). This iterative processing continues for each value of j until j=5, thereby filling in each entry for $H_1$ in row i (row 1) of similarity matrix 1200.

After the last entry of row i (row 1) has been added to similarity matrix 1200, flow moves to decision box 1165 where a query is made as to whether j<n (i.e., Is 5<5?). Because j is not less than 5, flow moves to decision box 1175 where a query is made as to whether i<n (i.e., Is 1<5?). Because 1 is less than 5, flow moves to step 1180 where i is set to 2 (i.e., i=i+1) and flow loops back to step 1115 where j is set to 1. The inner iterative loop then begins in step 1120 to determine the similarity distance between host file inventory $I_i$ ($I_2$) of host $H_i$ ($H_2$) and each host file inventory $I_j$ ($I_1$) through $I_5$). Thus, rows 1160 are successively filled with similarity distance values $a_{i,j}$ until each row has been completed.

After the compression method of flow 1100 has finished processing, similarity matrix 1200 can be provided as input to a similarity-based clustering procedure, as previously described herein with reference to clustering techniques used with a vector matrix. Information generated from the clustering procedure could be provided in numerous ways, as previously described herein with reference to FIG. 9. In one example, the information could be provided in a proximity plot such as example proximity plot 800 illustrated in FIG. 8, which has been previously shown and described herein.

Software for achieving the operations outlined herein can be provided at various locations (e.g., the corporate IT headquarters, end user computers, distributed servers in the cloud, etc.). In other embodiments, this software could be received or downloaded from a web server (e.g., in the context of purchasing individual end-user licenses for separate networks, devices, servers, etc.) in order to provide this system for clustering host inventories. In one example implementation, this software is resident in one or more computers sought to be protected from a security attack (or protected from unwanted or unauthorized manipulations of data).

In other examples, the software of the system for clustering host inventories in a computer network environment could involve a proprietary element (e.g., as part of a network security solution with McAfee® EPO software, McAfee® Application Control software, etc.), which could be provided in (or be proximate to) these identified elements, or be provided in any other device, server, network appliance, console, firewall, switch, information technology (IT) device, distributed server, etc., or be provided as a complementary solution (e.g., in conjunction with a firewall), or provisioned somewhere in the network.

In certain example implementations, the clustering activities outlined herein may be implemented in software. This could be inclusive of software provided in central server 130 (e.g., via administrative module 140, host inventory preparation module 150 and clustering module 160) and hosts 110 (e.g., via host inventory feed 114). These elements and/or modules can cooperate with each other in order to perform clustering activities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIG. 1 may be more logical in its representation, whereas a physical architecture may include various permutations/combinations/hybrids of these elements.

In various embodiments, all of these elements (e.g., hosts 110, central server 130) include software (or reciprocating software) that can coordinate, manage, or otherwise cooperate in order to achieve the clustering operations, as outlined herein. One or all of these elements may include any suitable algorithms, hardware, software, components, modules, interfaces, or objects that facilitate the operations thereof. In the implementation involving software, such a configuration may be inclusive of logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.), which may be inclusive of non-transitory media. In some of these instances, one or more memory elements (as shown in FIG. 2) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

Any of the memory items discussed herein should be construed as being encompassed within the broad term 'memory element.' Similarly, any of the potential processing elements, modules, and machines described in this Specification should be construed as being encompassed within the broad term 'processor.' Each of the computers, servers, and other devices may also include suitable interfaces for receiving, transmitting, and/or otherwise communicating data or information in a network environment.

Note that with the examples provided herein, interaction may be described in terms of two, three, four, or more network components. However, this has been done for purposes of clarity and example only. It should be appreciated that the system can be consolidated in any suitable manner. Along similar design alternatives, any of the illustrated computers, modules, components, and elements of FIG. 1 may be combined in various possible configurations, all of which are clearly within the broad scope of this Specification. In certain cases, it may be easier to describe one or more of the functionalities of a given set of flows by only referencing a limited number of components or network elements. Therefore, it should also be appreciated that the system of FIG. 1 (and its teachings) is readily scalable. The system can accommodate a large number of components, as well as more complicated or sophisticated arrangements and configurations. Accordingly, the examples provided should not limit the scope or inhibit the broad teachings of the system as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the clustering system in that any suitable arrangements, chronologies, configurations, and timing mechanisms may be provided without departing from the teachings of the discussed concepts.

What is claimed is:

1. One or more non-transitory media including code for execution that, when executed by a processor, is operable to:
    obtain a plurality of host file inventories corresponding respectively to a plurality of hosts in a network environment, wherein each of the plurality of host file inventories includes one or more file identifiers, each of the file identifiers of a particular host file inventory representing a different executable file on one of the plurality of hosts corresponding to the particular host file inventory;
    calculate input data by transforming the plurality of host file inventories into a similarity matrix for the plurality of hosts, wherein for at least each unique pair of host file inventories of the plurality of host file inventories, the transforming includes:
    determining a normalized compression distance (NCD) between the unique pair of host file inventories;
    determining a numerical value representing a similarity distance between the unique pair of host file inventories, the numerical value being determined based on the NCD; and
    updating the similarity matrix to include the numerical value representing the similarity distance between the unique pair of host file inventories; and
    provide the input data to a clustering procedure to group the plurality of hosts into one or more clusters of hosts, wherein the one or more clusters of hosts are grouped using a predetermined similarity criteria.

2. The one or more non-transitory media of claim 1, wherein the determining the NCD includes:
    storing, in a first file, one or more file identifiers of a first host file inventory of the unique pair of host file inventories;
    storing, in a second file, one or more file identifiers of a second host file inventory of the unique pair of host file inventories;
    concatenating the first and second files in a concatenated file;
    compressing the first file into a compressed first file;
    compressing the second file into a compressed second file; and
    compressing the concatenated file into a compressed concatenated file, wherein the NCD is computed based on the compressed first file, the compressed second file, and the compressed concatenated file.

3. The one or more non-transitory media of claim 1, wherein a variable n represents a total number of the plurality of hosts, the similarity matrix being an n by n ("n×n") matrix.

4. The one or more non-transitory media of claim 1, wherein each entry in the similarity matrix is one of a plurality of numerical values included in the similarity matrix, wherein each entry represents a similarity distance between a pair of hosts of the plurality of hosts.

5. The one or more non-transitory media of claim 4, wherein only one-half of the plurality of numerical values that are not entries in a diagonal line of symmetry in the similarity matrix are determined, and wherein the determined numerical values are reflected over the diagonal line of symmetry in the similarity matrix.

6. The one or more non-transitory media of claim 1, wherein the code for execution, when executed by a processor, is further operable to:

generate information indicating the one or more clusters of hosts, wherein each of the one or more clusters includes at least one host.

7. The one or more non-transitory media of claim 6, wherein the information is a proximity plot.

8. The one or more non-transitory media of claim 1, wherein the clustering procedure is an agglomerative hierarchical clustering technique with the predetermined similarity criteria including a cut point determination to define a stopping point of the clustering procedure.

9. The one or more non-transitory media of claim 1, wherein the clustering procedure is a partitional clustering technique.

10. An apparatus, comprising:
at least one processor coupled to at least one memory element;
a host inventory preparation module that when executed by the at least one processor, is configured to:
obtain a plurality of host file inventories corresponding respectively to a plurality of hosts in a network environment, wherein each of the plurality of host file inventories includes one or more file identifiers, each of the file identifiers of a particular host file inventory representing a different executable file on one of the plurality of hosts corresponding to the particular host file inventory; and
calculate input data by transforming the plurality of host file inventories into a similarity matrix for the plurality of hosts, wherein for at least each unique pair of host file inventories of the plurality of host file inventories, the transforming includes:
determining a normalized compression distance (NCD) between the pair of host file inventories;
determining a numerical value representing a similarity distance between the pair of host file inventories, the numerical value being determined based on the NCD; and
updating the similarity matrix to include the numerical value representing the similarity distance between the pair of host file inventories; and
a clustering module that when executed by the at least one processor, is configured to:
receive the input data; and
group the plurality of hosts into one or more clusters of hosts, wherein the one or more clusters of hosts are grouped using a predetermined similarity criteria.

11. The apparatus of claim 10, wherein the clustering module, when executed by the at least one processor, is further configured to:
generate information indicating the one or more clusters of hosts, wherein each of the one or more clusters includes at least one host.

12. The apparatus of claim 10, wherein the information is a proximity plot.

13. The apparatus of claim 10, wherein the clustering module includes an agglomerative hierarchical clustering technique with the predetermined similarity criteria including a cut point determination to define a stopping point of the clustering module.

14. The apparatus of claim 10, wherein the clustering module includes a partitional clustering technique.

15. The apparatus of claim 10, wherein the determining the NCD includes:
storing, in a first file, one or more file identifiers of a first host file inventory of the unique pair of host file inventories;
storing, in a second file, one or more file identifiers of a second host file inventory of the unique pair of host file inventories;
concatenating the first and second files in a concatenated file;
compressing the first file into a compressed first file;
compressing the second file into a compressed second file; and
compressing the concatenated file into a compressed concatenated file, wherein the NCD is computed based on the compressed first file, the compressed second file, and the compressed concatenated file.

16. The apparatus of claim 10, wherein a variable n represents a total number of the plurality of hosts, the similarity matrix being an n by n ("n×n") matrix.

17. The apparatus of claim 10, wherein each entry in the similarity matrix is one of a plurality of numerical values included in the similarity matrix, wherein each entry represents a similarity distance between a pair of hosts of the plurality of hosts.

18. The apparatus of claim 17, wherein only one-half of the plurality of numerical values that are not entries in a diagonal line of symmetry in the similarity matrix are determined, and wherein the determined numerical values are reflected over the diagonal line of symmetry in the similarity matrix.

19. A computer implemented method executed by one or more processors, comprising:
obtaining a plurality of host file inventories corresponding respectively to a plurality of hosts in a network environment;
calculating input data by transforming the plurality of host file inventories into a similarity matrix for the plurality of hosts, wherein, for at least each unique pair of host file inventories of the plurality of host file inventories, the transforming includes:
storing, in a first file, one or more file identifiers of a first host file inventory of the pair of host file inventories;
storing, in a second file, one or more file identifiers of a second host file inventory of the pair of host file inventories;
concatenating the first and second files in a concatenated file;
compressing the first file into a compressed first file;
compressing the second file into a compressed second file; and
compressing the concatenated file into a compressed concatenated file;
determining a normalized compression distance (NCD) between the first and second host file inventories based on the compressed first file, the compressed second file, and the compressed concatenated file;
determining a numerical value representing a similarity distance between the pair of host file inventories, the numerical value being determined based on the NCD; and
updating the similarity matrix to include the numerical value representing the similarity distance between the pair of host file inventories; and
providing the input data to a clustering procedure to group the plurality of hosts into one or more clusters of hosts, wherein the one or more clusters of hosts are grouped using a predetermined similarity criteria.

20. The computer implemented method of claim 19, wherein each of the plurality of host file inventories includes one or more file identifiers, each of the file identifiers of a particular host file inventory representing a different executable file on one of the plurality of hosts corresponding to the particular host file inventory.

21. The method of claim 19, wherein each entry in the similarity matrix is one of a plurality of numerical values included in the similarity matrix, wherein each entry represents a similarity distance between a pair of hosts of the plurality of hosts.

22. The method of claim 21, wherein only one-half of the plurality of numerical values that are not entries in a diagonal line of symmetry in the similarity matrix are determined, and wherein the determined numerical values are reflected over the diagonal line of symmetry in the similarity matrix.

23. The method of claim 19, wherein the clustering procedure is an agglomerative hierarchical clustering technique with the predetermined similarity criteria including a cut point determination to define a stopping point of the clustering procedure.

24. The method of claim 19, wherein the clustering procedure is a partitional clustering technique.

* * * * *